(12) United States Patent  (10) Patent No.: US 7,384,603 B2
Klein et al.  (45) Date of Patent: Jun. 10, 2008

(54) DEVICE FOR ARCHIVING AND ANALYZING OF MATERIALS (75) Inventors: Jens Klein, Heidelberg (DE); Stephan Andreas Schunk, Heidelberg (DE); Dirk Demuth, Nussloch (DE); Torsten Zech, Heidelberg (DE); Dieter Hoenicke, Karlsruhe (DE)

(73) Assignee: hte Aktiengesellschaft the high throughput experimentation company, Heidelberg (DE)

( * ) Notice: Subject to any disclaimer, the term of this patent is extended or adjusted under 35 U.S.C. 154(b) by 0 days.

(21) Appl. No.: 10/473,893

(22) PCT Filed: Apr. 5, 2002

(86) PCT No.: PCT/EP02/03817

§ 371 (c)(1),
(2), (4) Date: Mar. 4, 2004

(87) PCT Pub. No.: WO02/081075

PCT Pub. Date: Oct. 17, 2002

(65) Prior Publication Data

US 2004/0121432 A1  Jun. 24, 2004

(30) Foreign Application Priority Data

Apr. 6, 2001 (DE) ................................. 101 17 275

(51) Int. Cl.
G01N 15/10 (2006.01)
(52) U.S. Cl. ..................................... 422/68.1; 422/102
(58) Field of Classification Search ............... 422/68.1, 422/102
See application file for complete search history.

(56) References Cited

U.S. PATENT DOCUMENTS

| 5,585,069 | A | 12/1996 | Zanzucchi et al. |
| 5,751,629 | A | 5/1998 | Nova et al. |
| 5,942,387 | A | 8/1999 | Hollinshead |
| 6,045,755 | A | 4/2000 | Lebl et al. |
| 6,063,282 | A | 5/2000 | Moulton |
| 6,136,274 | A | 10/2000 | Nova et al. |
| 6,399,031 | B1 * | 6/2002 | Herrmann et al. .......... 422/197 |
| 6,447,723 | B1 * | 9/2002 | Schermer et al. ............. 422/62 |

(Continued)

FOREIGN PATENT DOCUMENTS

DE  43 10 169  9/1993

(Continued)

OTHER PUBLICATIONS

International Search Report for PCT/EP02/03817.

(Continued)

*Primary Examiner*—Jill Warden
*Assistant Examiner*—Natalia Levkovich
(74) *Attorney, Agent, or Firm*—Jones Day (57) ABSTRACT The present invention relates to a device (10) for analyzing and archiving at least one combinatorial library of materials, comprising at least:
a. an area for analyzing and holding materials, consisting at least of two sections (12) capable of holding at least two building blocks (20),
b. means for feeding and/or discharging fluid media to and/or from at least one section (12),
c. means for identifying the device (10) or the combinatorial library of materials or for identifying the device (10) and the combinatorial library of materials.

5 Claims, 9 Drawing Sheets

U.S. PATENT DOCUMENTS

| | | | |
|---|---|---|---|
| 6,649,403 B1 * | 11/2003 | McDevitt et al. | 436/518 |
| 6,893,816 B1 * | 5/2005 | Beattie | 435/6 |
| 2002/0094533 A1 * | 7/2002 | Hess et al. | 435/6 |
| 2003/0044324 A1 * | 3/2003 | Micklash et al. | 422/102 |

FOREIGN PATENT DOCUMENTS

| | | |
|---|---|---|
| DE | 199 20 156 | 1/2000 |
| DE | 198 38 232 | 3/2000 |
| DE | 198 50 233 | 5/2000 |
| DE | 100 59 890 | 6/2000 |
| DE | 200 09 620 | 8/2000 |
| DE | 100 42 871 | 5/2002 |
| GB | 2 349 641 | 8/2000 |
| WO | 98/15969 | 4/1998 |
| WO | 99/20396 | 4/1999 |
| WO | 99/32219 | 7/1999 |
| WO | 99/41005 | 8/1999 |
| WO | 99/41006 | 8/1999 |
| WO | 99/59716 | 11/1999 |
| WO | 99/59722 | 11/1999 |
| WO | 00/20117 | 4/2000 |
| WO | 00/29844 | 5/2000 |
| WO | 00/32512 | 6/2000 |
| WO | 00/47540 | 8/2000 |
| WO | 00/51720 | 9/2000 |
| WO | 01/09607 | 2/2001 |

OTHER PUBLICATIONS

E. Reddington, A. Sapienza, B. Gurau, R. Viswanathan, S. Sarangapani, E.S. Smotkin, T.E. Mallouk, *Combinatorial Chemistry: A Highly Parallel, Optical Screening Method for Discovery of better Electrocatalysts*, 280 Science 1735-37 (1998).

W.E. TeGrotenhuis, et al., Microchannel Devices for Efficient Contacting of Liquids in Solvent Extraction, 2nd International Conference on Microreaction Technology, Topical Conference Preprints, New Orleans, Louisiana 329-334 (Mar. 1998).

A.E. Guber, et al., IR Spectroscopic Studies of a Chemical Reaction In Various Micromixer Designs, 2nd International Conference on Microreaction Technology, Topical Conference Preprints, New Orleans, Louisiana 284-289 (Mar. 1998).

M.W. Losey, et al., A Micro-packed Bed Reactor for Chemical Synthesis, in W. Ehrfeld (ed.), Microreaction Technology: Industrial Prospects, Proceedings of the 3rd Int'l Conference on Microreaction Technology 277-286 (2000).

J. Antes, et al., Use of Microreactors for Nitration Processes, 4th Int'l Conference on Microreaction Technology, Topical Conference Proceedings, Atlanta, Georgia 194-200 (Mar. 2000).

T.M. Floyd, et al., Towards Integration of Chemical Detection for Liquid Phase Microchannel Reactors, 4th Int'l Conference on Microreaction Technology, Topical Conference Proceedings, Atlanta, Georgia 461-466 (Mar. 2000).

* cited by examiner

DEVICE FOR ARCHIVING AND ANALYZING OF MATERIALS

FIELD

The present invention relates to a device for analyzing and archiving of materials of at least one combinatorial library of materials.

The device according to the invention can be employed very flexibly for high throughput screening of materials within an automated work flow, e.g., in the field of heterogeneous catalysis. The device is characterized in particular by its multifunctionality with respect to screening and by its potential to archive large libraries of materials. Due to its multifunctionality, new possibilities for standardization and automation of combinatorial tests or analyses emerge, for example in the field of combinatorial catalysis.

BACKGROUND

Combinatorial tests of heterogeneous catalysts are known from, amongst others, WO 99/41005. In that reference, a process is described for the parallel testing of multiple materials with respect to their catalytic properties. In a tubular bundle reactor, a multitude of active masses is reacted with identical mixtures of educt gases in spatially separated channels. The products contained in the exhaust flow of materials are then characterized analytically and quantified, e.g., by gas chromatography. Due to the compact design and the fact that the catalysts can be studied under realistic conditions, up to 100 types of materials can be tested sensibly. However, a larger-scale reactor of this type can hardly be realized due to its inert heating and cooling behavior and its high gas consumption. In addition, the time required for analysis would not be tolerable.

The reference WO 00/51720 describes microreactors of an array of catalysts and takes only the reaction step into account. The procedure as described in the reference is strongly adapted to the analysis of adsorbers and relies mostly on layers or films as far as the materials to be screened are concerned. Assembling and disassembling a new library is not straightforward, i.e. cumbersome and requiring manual work. Also, open libraries are used in most cases, limiting the scope for storage.

The technology of mass spectroscopy as described in WO 00/29844 is cumbersome to handle since all materials to be screened have to be present as pellets or the like. The design of the reactor basically requires that these pellets have to be exchanged perpetually. In addition, the design is not truly two-dimensional. Storage of the materials is not possible and the potential for automation is highly limited.

Microreactors for heterogeneously catalyzed reactions, as described in the literature, are almost exclusively limited to using microreators for manufacturing products. The concept of parallel coupling is mentioned only in WO 00/51720. In the case of microreactors, catalysts are mostly applied as catalytically active layers. The embedding of micro-packed bulk goods is described in the work of Jensen/MIT (M. W. Losey, M. A. Schmidt, K. F. Jensen: A micro-packed bed reactor for chemical synthesis, in: W. Ehrfeld (Ed.): Microreaction Technology: Industrial Prospects, Proceedings of the $3^{rd}$ International Conference on Microreaction Technology, Springer, 2000, 277-286), albeit without taking parallel coupling into account.

A glass reactor is described in: J. Antes, T. Tuercke, E. Marioth, K. Schmid, H. Krause, S. Loebbecke: Use of microreactors for nitration processes, $4^{th}$ International Conference on Microreaction Technology, Topical Conference Proceedings, Atlanta/Ga., March 2000, 194-200. Here, product analysis is performed using IR transmission. This technique can also be applied for screening. Furthermore, the following studies are known with respect to combining microreactors and IR analysis: T. M. Floyd, K. F. Jensen, M. A. Schmidt: Towards integration of chemical detection for liquid phase microchannel reactors, $4^{th}$ International Conference on Microreaction Technology, Topical Conference Proceedings, Atlanta/Ga., March 2000, 461-466 as well as A. E. Guber, W. Bier, K. Schubert: IR spectroscopic studies of a chemical reaction in various micromixer designs, $2^{nd}$ International Conference on Microreaction Technology, Topical Conference Preprints, New Orleans/La., March 1998, 284-289. However, these studies describe the evaluation of reaction progress only.

It is also known that membranes prepared by microtechniques can be partially employed as functional elements in microreactors. However, these membranes are merely used for the separation of different phases within a reactor.

The reference WO 00/32512 describes Pd-based membranes for separating materials (e.g. $H_2$ and CO in fuel cells) prepared by microtechniques, as well as the permeation of $H_2$ through the membrane into a liquid phase on the other side of the membrane for the purpose of hydrogenation. Parallel coupling is described only in the context of enhancing the throughput, i.e., parallel coupling of identical reactors with identical catalysts.

Microstructured membranes for extraction as used in microreactors are described in W. E. Grotenhuis, R. J. Cameron, M. G. Butcher, P. M. Martin, R. S. Wegeng: Microchannel devices for efficient contacting of liquids in solvent extraction, $2^{nd}$ International Conference on Microreaction Technology, Topical Conference Preprints, New Orleans/La., Mar. 1998, 329-334. Here, two different liquid phases can be brought into contact at these membranes to enable the exchange of materials without mixing of the two phases. Due to the different wetting behavior of the pores with respect to the liquid phases, each liquid phase remains at the side of the membrane it is intended to be.

In combinatorial chemistry, only micro- and nano-titration plates are known as "devices" for holding biological, biochemical or chemical samples. In addition, it is known that materials can be immobilized on a solid support and be screened at the same time, e.g., on large-scale sheets of specifically prepared filter paper (see C. E. Mallouk et al., Science 280 (1998), 1735ff). Nothing is known about such "devices" in the field of combinatorial materials research.

SUMMARY

Therefore, the object of the present invention was to provide a device for the analysis and the archiving, as well as, if applicable, for the implementation of a combinatorial library of materials. It is possible, by employing this device, to save the additional step of rearranging the building blocks of one or of several combinatorial libraries of materials in between two individual process steps. This is in contrast to the present state of technological development and will speed up or optimize the analysis and the archiving as well as, if applicable, the implementation of combinatorial libraries of materials. Therefore, the entire process can be facilitated in an integrated manner.

These and additional tasks are solved by means of the following device for analyzing and archiving at least one combinatorial library of materials, comprising at least:

(a) an area of analysis and uptake, including, at least, two sections for the uptake of at least two building blocks,
(b) means for feeding and/or discharging fluid media to/from at least one section,
(c) means for identifying the device or the combinatorial library of materials or for identifying the device and the combinatorial library of materials.

According to the present invention, the device is furthermore characterized in that at least two sections contain at least one spout, respectively.

The expression "combinatorial library of materials", as used in the context of the present invention, refers to an array of at least two, preferably up to 10, more preferred up to 100, in particular up to 1000, and further preferred up to 100,000 materials or chemical compounds or mixtures of chemical compounds, i.e. entities that are referred to as "building blocks" in the present invention. In turn, these building blocks are located in different, separated sections of the device according to the invention. A number of building blocks larger than 100,000 is not excluded and therefore conceivable as well.

The sections for holding at least two building blocks preferably display suitable openings of any conceivable geometrical shape. A "section", as defined in the context of the present invention, refers to segments within the device according to the invention, such as cavities, which can be retrieved under all conditions due to their well-defined coordinates. These sections (or segments) are suited for holding the building blocks and are preferably designed to function as reaction chambers at the same time.

The sections can be formed by several elements of the device that can be, for example, plate- or disk-shaped. Preferably, the sections extend over at least two plates or disks, with one plate or disk preferably forming the bottom, one the central part and one the top of the section.

All sections together form the area of analysis and uptake of the present invention.

According to the invention, the device is characterized in that at least two sections that hold at least two building blocks are completely isolated from each other, either with respect to material and thermal flow or with respect to material or thermal flow. Preferably, all sections of the device, respectively, are isolated from each other as described above, either completely or partially, however, complete isolation is preferred.

Isolation with respect to material flow is achieved by hermetically sealing the sections with respect to each other, preferably by means of contact bonding after the building blocks have been inserted, so that no exchange of fluids is possible between individual sections.

Thermal isolation of the individual sections against each other is accomplished by choosing suitable materials for the device with respect to their thermal properties, such as thermal conductivity. This is particularly called for in case of exothermic reactions. In addition, the device can contain passive and/or active heat sinks in between the individual sections.

The expression "building block" refers to a singular, well-defined unit, which is located in one of the respective separated sections of the combinatorial library of materials within the device according to the invention. A building block can consist of one material or of multiple materials or components.

In the context of the present invention, such building blocks are preferably made of non-gaseous materials, such as solids, liquids, sols, gels, paraffin-based substances or mixtures, dispersions, emulsions, or suspensions, with solids being particularly preferred. The materials used in the context of the present invention can be molecular or non-molecular chemical compounds, formulations, mixtures or materials. The expression "non-molecular" thereby refers to substances that can be altered or varied continually and that stand, therefore, in contrast to "molecular" substances, whose structural expression can only be varied via discrete states, such as by varying the pattern of substitution.

The composition of the building blocks is given by the stoichiometry as well as by the composition of the substances and the elements of the materials to be tested. The composition can vary from material to material. Therefore, it is possible, according to the invention, to implement or to test combinatorial libraries of materials, which are made of materials that are identical with respect to their elemental composition but different with respect to the stoichiometric composition of the elements that define the material. Furthermore, it is possible that the combinatorial library of materials consists of materials that are different from each other with respect to their elemental composition. Obviously, it is also possible that the respective materials are different with regard to their stoichiometric and their elemental composition. Furthermore, it is possible that the combinatorial libraries of materials consist of building blocks that are identical with respect to their elemental and stoichiometric composition, but are different with respect to their physical, chemical or physical chemical properties as a consequence of process step. Above, the expression "element" refers to elements of the periodic table of the elements. The expression "substance" refers to materials, components or precursor components that lead towards a material.

By using the process according to the invention, the type of building blocks can be varied in any conceivable way and in a simple manner. These building blocks include but are not limited to: heterogeneous or homogeneous catalysts, lumiphores or thermoelectrical, piezoelectrical, semiconducting, electrooptical, supraconducting or magnetic substances or mixtures consisting of two or more of these substances, in particular, intermetallic compounds, oxides, oxide mixtures, mixed oxides, ionic or covalent compounds of metals and/or non-metals, metallic alloys, ceramics, organometallic compounds and composite materials, dielectrical, thermoelectrical, magnetoresistant or magnetooptical materials, as well as organic compounds, enzymes, mixtures of enzymes, pharmaceutical substances and drugs, substances for animal feed and feed supplements, substances for food and food supplements or cosmetics, or mixtures of at least two of the aforementioned substances. Furthermore, it is possible that all combinations of materials can be tested by choosing a suitably different elemental composition and creating a multitude of mostly similar materials that vary, nevertheless, with respect to at least one element.

The building blocks of the combinatorial library of materials can be similar or dissimilar with respect to each other, with the latter being the preferred case.

Preferably, the building blocks of the combinatorial library of materials are realized as individual bodies, such as balls, monoliths, cylindrical bodies etc.

The fact that the building blocks are present as individual bodies is preferred for the device according to the invention since this facilitates the loading of the sections of the device with building blocks and the unambiguous identification of the building blocks. The process of loading the device is preferably part of a distribution step, in which the building blocks are distributed to the sections of the device. The expression "distribution" preferably refers to a physical transfer of the building blocks into the device according to the invention. According to the invention, this step is referred to as inserting. In the course of the process of insertion, each section is preferably loaded with one building block. It is also conceivable that individual sections or arrays of sections are not loaded with building blocks, or are loaded with several building blocks.

As far as the manufacturing of the at least two building blocks is concerned, or, preferably, of a large number of building blocks, all manufacturing methods known to the expert can be employed. Such methods of manufacturing are known, for example, from combinatorial materials research. In particular, reference is made in this context to the "Verfahren zur Herstellung einer Vielzahl von Bausteinen einer Materialbibliothek" (Process for manufacturing a multitude of building blocks for a combinatorial library of materials) that is described in DE-A 100 59 890.0, which is fully incorporated into the present application by reference. Furthermore, reference is made to the procedures of manufacturing as described in DE-A 100 42 871.1 and WO 99/59716.

The manufacturing of the building blocks can occur within as well as outside of the device according to the invention. It is also conceivable that parts of the manufacturing process or precursor steps are performed outside of the device according to the invention, with the manufacturing of the building blocks being completed within the device according to the invention. This holds in particular if it is taken into account that a building block may be made of several components.

The means for feeding and/or discharging of, preferably, fluid media are preferably realized by tubular openings or channels, such as tubes, capillaries, borings or porous layers. The means for feeding and/or discharging are preferably oriented at an angle relative to the equatorial plane of the device, preferably 90 degrees. Furthermore, it is conceivable that feed and discharge lines are oriented at an angle relative to each other, possibly in different planes. In this case too, an angle of 90 degrees is preferred with feed and discharge lines being located within one plane.

Here, the expression "channel" preferably refers to a connection that penetrates a body, in this case, for example, a plate or a disk, and connects two openings located at the surfaces of the body, thus allowing, for example, the transport of a fluid through the body. Thereby, the channel can be of any conceivable geometrical shape. The channel can display a cross-sectional area that varies along the length of the channel or, preferably, that remains constant. For example, the cross section of the channel can be of any of the following shapes: oval, round or polygonal, with straight or bent connections between the corner points of the polygon. The preferred cross-section is of round or equidistant polygonal shape. Preferably, all channels within the body display the same geometry (cross-section and length) and run parallel to each other.

Furthermore, the device according to the invention is characterized in that the means for feeding and discharging the fluid media contain at least one membrane. Here, membranes are, preferably, permeable or semi-permeable sealings or part of a sealing, which can be equipped, in principle, with a closing or blocking device for opening and closing the membrane. Preferably, the device according to the invention is characterized in that the membrane is porous with the pores being of well-defined texture to equipartition the pressure of the fluid media.

According to the invention, the expression "porous membrane" refers to a membrane that preferably consists of a porous system. Here, the porous system can be ordered and/or disordered and directional and/or non-directional.

As far as the dimensions and the number of pores are concerned, no limitations are specified so long as feed and/or discharge of the fluid media is maintained. Furthermore, the pores should be transmissive with respect to radiation, such as electromagnetic radiation as manifested by, e.g., magnetic fields, visible, ultraviolet or x-ray radiation, microwaves or thermal radiation.

However, if gaseous media are used, the pore diameter preferably ranges from 1 to 500 μm, particularly preferred from 5 to 30 μm and the pore length ranges, preferably, from 1 to 1000 μm, particularly preferred from 50 to 200 μm.

If media of a state other than the liquid state are used, pore diameter and length are to be adapted correspondingly.

The number of pores per feed and/or discharge preferably ranges from 1 to 1000 with particular preference for 3 to 20 pores.

The preferred distribution of pore radii is unimodal. However, multimodal and/or hierarchically organized pore systems are conceivable as well. Here, the pores are preferably oriented in parallel and preferably in the direction of the flow of the fluid media. The pores can also be arranged in a non-straight manner and can be arranged as an interconnected pore system.

Such pore systems lead to equipartition of the fluid across all sections. This enables good scaling properties and a large degree of parallel coupling compared to, for example, binary or quaternary trees.

As far as the manufacturing process for the pores is concerned, all processes known to the expert and suitable for manufacturing the pores as described above can be employed. By means of example, the following processes are specified: lithographic processes, etching, LIGA, laser ablation, drilling, milling, grinding, lapping (such as ultrasonic lapping), ECM, silk screen printing, lithographic-galvanic abrasion, imprinting, stamping etc. Suitable pore membranes can also be manufactured by means of crystallization processes and/or ceramic processes, as well as by sintering or template-based processes. Examples for such pore membranes include foam ceramics, zeolite membranes, sintered metal filters, glass filters, inorganic porous filter media and many more.

According to the invention, the device is characterized furthermore by the possibility to identify the device by using a code. The code is implemented by a method of encoding, preferably chosen among the following group: mechanical encoding, optical encoding, magnetic encoding, radioactive encoding or radio frequency analysis.

The method of encoding can be chosen, in principle, from any of the encoding systems known to the expert using alpha-numerical, numerical or alphabetical codes. The aim of the respective method of encoding is to link individual information (such as information about individual building blocks of the combinatorial library of materials, information about the process history of individual building blocks, information from the analysis, i.e. properties of first and/or second order and catalytic properties as obtained from testing the performance characteristics) to so-called collective information (such as information about the entire combinatorial library of materials, process history or manufacturing data). Here, the goal is to design the encoding as efficient as possible and to establish a logical data stream free of error.

It is important to consider that the code to be used for encoding has to be fully readable under the respective conditions of reactions. Therefore, optical bar codes are employed preferably.

Systems of identification are used preferably for recognizing the device according to the invention by using its intrinsic, object-specific information that is preferably encoded. Encoding may also be implemented mechanically, for example by switching shafts, or magnetically, by OCR characters or by means of a bar code, which is the most commonly employed method.

The bar code, which is the preferred means of identification for the device, consists of an array of thick and thin gaps or pixels (such as dots or other shapes) alternating with "white" bars according to a specific pattern as defined by the syntax of the code. The bars, dots and/or differently shaped signs as well as the gaps between them can also be realized as indentations in the respective substrate material for the bar code. Known types of code are: code 2/5, code 2/5i, code 39, EAN code, code 129, PDF417 bar code, CODE-ABLOCK bar code, UPS MaxiCode bar code, micro-PDF417 bar code, standard 2 of 5 bar code, QR code bar code, data matrix bar code, amongst others.

The quality of identification is determined by, among others factors, the width and the ratio of widths (a ratio of 1:3 is particularly suitable) of the thin and thick bars or gaps, by the tolerance allowed for the width, by the degree of blackening, and by the sharpness of the contour of the bars.

Identification can be accomplished by mechanical shape recognition and/or imprinting.

Applying the bar code onto the device can be accomplished in principle by all means of application or imprinting known to the expert taking into account that the respective process has to guarantee sufficient stability of the bar code with respect to the prevailing reactive conditions, such as high temperature or the presence of corrosive gases. One of the most important criteria is thereby the readability of the bar code. Suitable methods for applying or imprinting the bar code are, among others, (im)printing, engraving, lithographic processes, etching, LIGA processes, laser ablation, drilling, milling, grinding, lapping (such as ultrasonic lapping), ECM processes, silk print processes etc.

The processes mentioned in the context of applying the bar code onto the device are also suited for the manufacturing of the device itself.

Preferably, the bar code for identifying is etched into the device.

In addition, programmable data storage devices can be envisioned for identifying the device according to the invention, such as EEPROM or RAM, allowing to reduce the data stream within the transport system, assuming that the data storage devices are functional under reactive conditions.

In a further embodiment, which is the preferred one, the device according to the invention contains means for identifying the position of the device. This is preferably realized by employing suitable geometrical contours and/or positional safeguard elements.

According to the invention, the means for identifying the device or the combinatorial library of materials or for identifying the device and the combinatorial library of materials can also include the means for identifying the position of the device.

Furthermore, the device according to the invention is characterized in that the means for identifying the device are simultaneously suited for identifying the position of the device.

According to the invention, the device is characterized in that it contains means for opening and closing. These means for opening and closing can be: mechanical sealing devices such as screw caps or bayonet caps, magnetic sealings, glue that can be thermally removed, bondings, press fittings, rivets, fasteners etc.

In addition, after being sealed, the multifunctional device can be stored in suitable boxes of a design similar to, in principle, common CD drives, CD-, DAT-, or minidisc-boxes. This provides, for example, protection against adverse environmental effects (encapsulation). Such an outer protective medium, for example in the form of a suitable box, preferably encapsulates the sections of the multifunctional device and is preferably removed or partially removed during a reaction. Partial removal can be accomplished, for example, by closing devices such as movable covers that are preferably removed or flipped open during a reaction. Building blocks that are archived in this manner can be subjected to further sets of changing conditions during the process of archiving. Such conditions include but are not limited to: treatment by contact with a fluid or with radiation, creating inert conditions, aging under reactive gas conditions and/or hydrothermal conditions or temperature treatment.

Furthermore, the device according to the invention is characterized in that it displays at least one fitting for working under reduced and/or increased pressure. Due to this feature, the building blocks can be subjected, for example, to well-defined pressure conditions while being treated or also while being analyzed. In addition, these fittings can be used for feeding and/or discharging fluid media.

In addition, the device according to the invention is characterized in that it is made of heat resistant materials. In principle, all materials known to the expert can be used that are thermally resistant, preferably from −78 degrees C. to 800 degrees C., particularly preferred from 20 degrees C. to 600 degrees C.

The heat resistant material is preferably selected from the following group of materials: silicon, glass, metals, alloys, ceramics, polymers, combinations of materials such as combinations of silicon and glass as well as composite materials.

In a further embodiment, the device contains means for stacking of the device. In principle, such means can be all elements and/or arrangements that are known to the expert and that are suited to render the device stackable.

Furthermore, the device is characterized by a Bodenstein number larger than 2, preferably larger than 5, particularly preferred larger than 10, in particular more than 100. Here, the Bodenstein number refers to flow velocities of less than 10 m/s, preferably ranging from 0.1 to 5 m/s, in particular from 0.3 to 3 m/s.

One of the main challenges that is encountered upon enlarging or reducing the size of a reactor is its scalability. This refers to the requirement that the dimensionless characteristic numbers, which have been determined to be important for describing the process, as well as quantities derived from these numbers, remain essentially unchanged upon scaling up or down. An important quantity for characterizing the flow conditions within a reactor is provided by the so-called Bodenstein number. The Bodenstein number quantifies the back mixing of fluid phases within a given reactor system. Highly simplified, three cases can be distinguished:

1. very small Bodenstein numbers at around unity, corresponding to badly stirred continually operated batch reactors 2. Bodenstein numbers ranging from 5 to 50, corresponding to well stirred continually operated batch reactors,
3. Bodenstein numbers ranging from 50 to 100, corresponding to tubular flow reactors as far as the flow characteristics are concerned.

Here, the Bodenstein number, Bo, is calculated as the ratio of the linear flow velocity times the characteristic tube length divided by the axial diffusion coefficient.

Specifically in reference to scaling down reactors, conserving a large Bodenstein number is known to be an important figure of merit. It is only for reactors with high Bodenstein numbers that it is guaranteed that diffusion limitations do not distort the results obtained from testing the catalyst.

In the references WO 00/51720, WO 98/15969 and WO 00/29844, reactor systems are introduced, in which a gas is essentially guided through a reaction chamber containing a packing of catalyst powder on the bottom. A design of this type is not ideal since distorted results may be obtained due to diffusion limitations. The data given in these references with respect to the reactors allow only for estimating the Bodenstein numbers.

Scaling down reactors is an attractive goal in the fields of combinatorial chemistry and high throughput research since the costs per load of catalysts and reactants can be lowered significantly. The present invention clearly teaches that upon scaling down a reactor, large Bodenstein numbers, i.e. little back mixing, can be achieved, corresponding to the characteristics found for tubular flow reactors.

Key quantities are the proper tuning of the size of the building block(s), for example molded bodies, and their size relative to the reactor cavity. The size of the molded body has to be adapted to the size of the reactor, so that the body is not too small relative to the reactor, which would lead to significant back mixing. The body should not be too big either since a large drop in pressure is introduced by the small gap between reactor walls and body. This limits the overall functionality of the reactor and can also adversely affect the flow characteristics.

The calculations presented in the following table are based on the following data: dz (characteristic reactor length, tube diameter in this case)=1200 micrometers; p (pressure)=1 bar; l (reactor length, length of the cavity in this case); D (coefficient of diffusion, for butan in air in this case)=$2.88 \times 10^{-5}$ $m^2/s$. The following table shows the Bodenstein numbers as obtained for three characteristic flow velocities, respectively.

| Building block diameter (micrometer) | Gas velocity (meter/sec) | Ratio of building block diameter to reactor diameter | Bodenstein number |
| --- | --- | --- | --- |
| 840 | 0.03 | 0.7 | 0.8 |
| 840 | 0.3 | 0.7 | 8 |
| 840 | 3 | 0.7 | 80 |
| 1000 | 0.03 | 0.83 | 1.04 |
| 1000 | 0.3 | 0.83 | 10 |
| 1000 | 3 | 0.83 | 100 |
| 1160 | 0.03 | 0.97 | 1.16 |
| 1160 | 0.3 | 0.97 | 11.6 |
| 1160 | 3 | 0.97 | 116 |

It is evident that the design according to this invention enables Bodenstein numbers ranging from 10 to 100 even at low flow velocities for the gas. This has not been achieved for this type of reactor so far (see state of the art) and is therefore of great benefit for catalyst research.

The device contains means for automated handling to integrate the device into a fully automated work flow.

Controlling and regulating of these means is preferably achieved by using a computer code by means of a programmable code wherein the code is preferably stored on a data storage device of a data processing unit.

The application of the device according to the invention within a fully automated system offers a significant logistical advantage since sample transfer, for example from step x to step y, can be achieved in one format and it is not necessary, as had been the case previously, to test and/or handle a multitude of samples.

Therefore, the device according to the invention in all its embodiments complies with a number of requirements, such as the ability to establish contact between fluid phases, access to a number of chemical and/or physical and/or physical chemical methods of analysis and possibilities for identifying samples and their format.

BRIEF DESCRIPTION OF THE DRAWINGS

The present invention is explained in more detail in the following figures.

DESCRIPTION

Figure 1A:
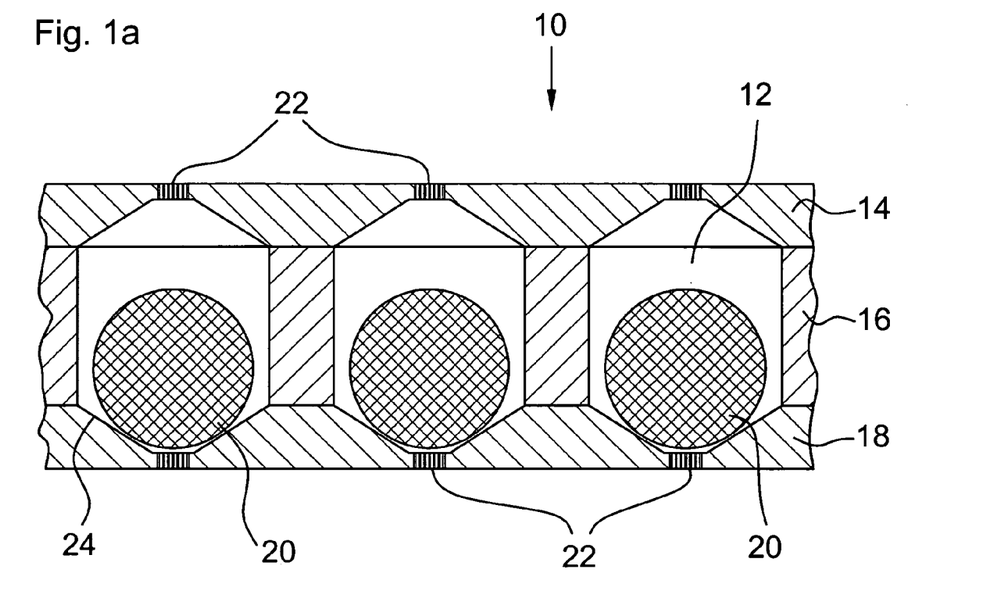
FIG. 1a schematic representation of the cross section of two sections of the device, displaying membranes on the sides of feed and of discharge.

FIG. 1a shows an embodiment of the device according to the invention (10), in which the sections (12) are formed by hollowing out a three-layer array of plates. This three-layered system consists of a first silicon layer (14), a glass layer (16) and a second silicon layer (18). The borings within the individual layers are of different shape so that an octagonal cross-sectional shape of the sections (12) results in the fully aligned state, as shown in FIG. 1.

In an alternate embodiment of the design shown in FIG. 1a, the glass layer (16) and the second silicon layer (18) are proposed to be one single layer that is preferably made of glass.

The individual layers depicted in FIG. 1a are preferably fused by contact bonding, e.g., at high pressure or temperature.

For the first silicon layer (14) and the second silicon layer (18), membranes (22) are proposed to be incorporated adjacent to the borings that are part of the sections (12). These membranes (22) are realized as porous membranes in the present design.

The building blocks (20) are shown as positions in the sections (12), resting within the area of the second silicon layer (18) in point contact on the walls of a spout (24) that is preferably of pyramidal shape. The spout (24) forms the discharge side of the section (12) and is preferably formed in the second silicon layer (18).

Supporting the building blocks (20) directly by the membrane easily leads to undefined flow conditions. For example, "wall-sided" positioning of the building block (20) [i.e. the building block (20) is in contact with the wall on one side] or "central" positioning of the building block (20) [i.e. the building block (20) rests centered on the membrane] leads to entirely different flow conditions. Therefore, direct contact between building block (20) and membrane (22) is not desirable and of no particular advantage.

Therefore, it was part of the objective of the present invention, to develop sections (12) whose design precludes direct contact between building block (20) and membrane (22) while simultaneously allowing free flow around the building block (20).

According to the present invention, this task has been solved by means of introducing a spout (24) of a specific geometry so that a sphere [building block (20)] is fixed in one specific position. The spout (24) can be realized as a pyramidal sink or as any other polyhedral sink. Typically, the diameter of the spout amounts to 35-95% of the diameter of the reactor chamber (section diameter), preferably to 45-85%. Typically, the spout is tapered from the area of contact of the building block (20) towards the side of the membrane (22). This can be realized, for example, by truncating the pyramidal shape. The tapering preferably amounts to 70-10% of the base width and preferably occurs in a continuous manner.

Part of the objective of the invention was to optimize the size of the spout and of the building block so that ideal flow conditions can be realized in the section (12) (reactor chamber). By calculating the characteristic numbers for the reactor, such as the Bodenstein number, and by numerical simulation of the flow conditions, it has been found that many wall effects occur if the diameter of the sphere reaches 90% of the reactor diameter, clearly having a negative impact. At a given pyramidal angle for the sink of x degrees, the sphere contacts the spout (pyramid-shaped) tangentially once the sphere diameter reaches 70% of the spout diameter. If the sphere is made smaller than this value, it falls into the spout, partially blocking the spout and running the risk of resting on the membrane (22).

Overall, a sphere diameter larger than 90% of the reactor diameter and smaller than 70% of the spout diameter is not advantageous and therefore not preferred.

According to the present invention, the residence time distribution can be changed by texturing the surface of the building blocks (20). Here, surface texturing can be realized by applying grooves of various geometrical shapes to the building blocks (20) (indentations or notches). Alternatively, ripples can be applied as well. In principle, every deviation from the ideal shape of a sphere can be viewed as surface texturing.

It is also of advantage, to employ several building blocks (20) (several spheres) or to employ rod-shaped building blocks in order to alter the flow profile so that it resembles plug-flow behavior. In addition, rod-shaped building blocks with channel openings are useful as well.

Figure 1B:
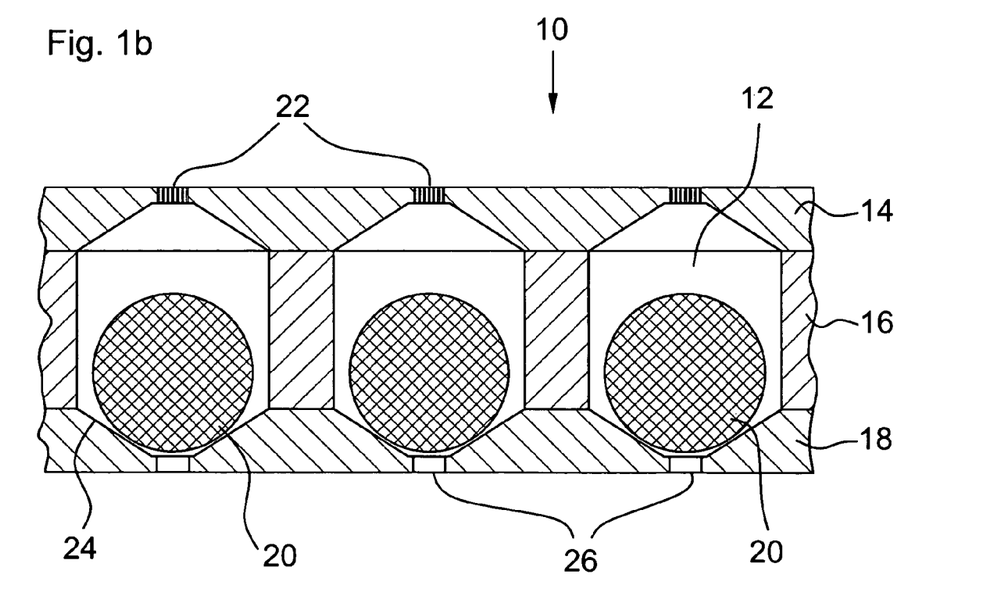
FIG. 1b schematic representation of the cross section of two sections of the device, displaying a membrane on the side of feed only.

FIG. 1b shows an alternate embodiment of the device (10) compared to the design shown in FIG. 1a. Here, openings (26) are proposed to be located on the discharge side, replacing the membranes (22) shown in FIG. 1a. These openings (26) are preferably realized as borings that are preferably shaped like channels.

Figure 1C:
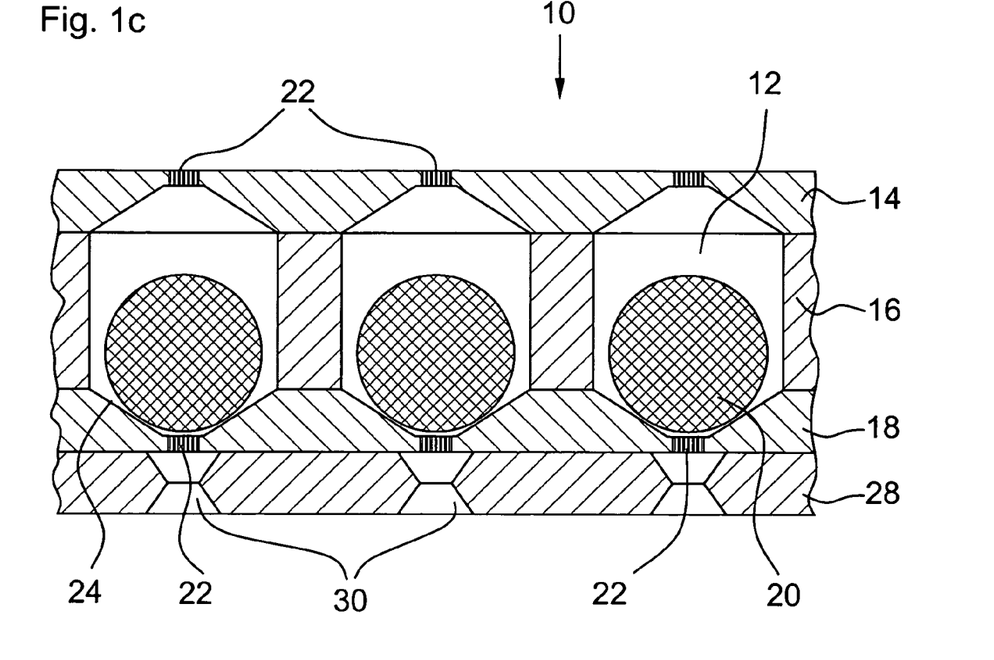
FIG. 1c schematic representation of the cross section of two sections of the device, displaying membranes on the sides of feed and of discharge and, additionally, a discharge guiding element.

FIG. 1c also shows an alternate embodiment of the design depicted in FIG. 1a. Here, a discharge guiding element (28) is proposed, adjacent to the second silicon layer (18). This discharge guiding element (28) is preferably plate-shaped and displays borings (30) lining up with the membranes (22) on the discharge side. In principle, these borings can be of any shape. However, a shape that corresponds to a "channel" as described above is preferred. This holds in particular for the contour of the cross-section. Particularly, a shape is preferred that provides favorable flow conditions for performing analysis, preferably.

Figure 1D:
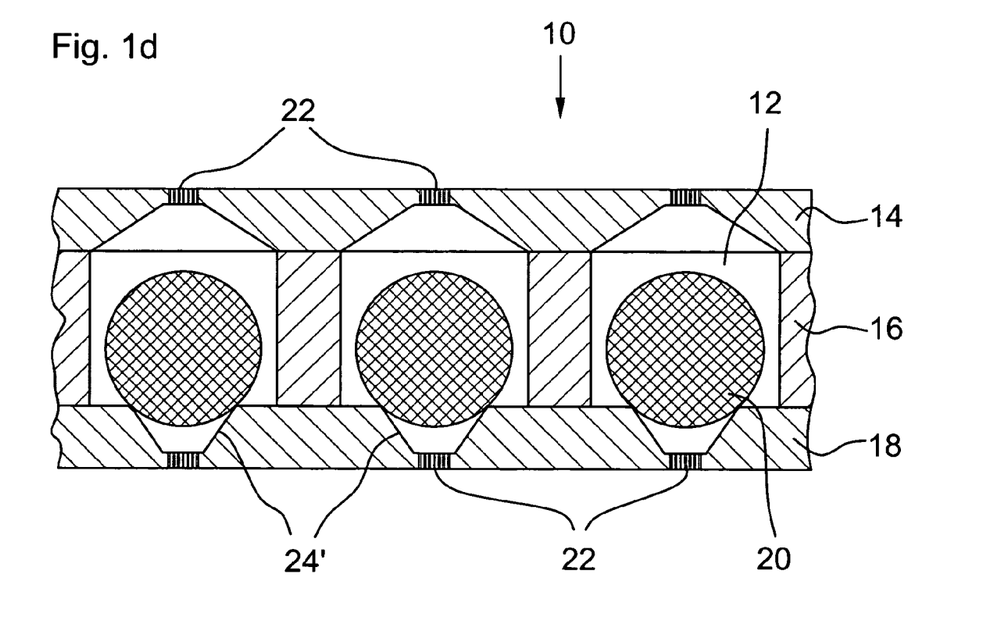
FIG. 1d schematic representation of the cross section of two sections of the device, displaying membranes on the sides of feed and of discharge with an alternate design of the spout of the section that is located on the side of discharge.

FIG. 1d shows an alternate embodiment of the design depicted in FIG. 1a. Here, a spout (24') is employed, which is of different size or shape compared to the spout (24) shown in FIG. 1a.

FIGS. 2a to 2d show different shapes for the cross-section of the sections (12) with the cross-sectional plane of the sections (12) shown in FIGS. 2a to 2d being oriented perpendicular to the cross-sectional plane shown in FIGS. 1a to 1d. Also, FIGS. 2a to 2d give a top view of the device (10) without showing the first silicon layer (14).

Figure 2A:
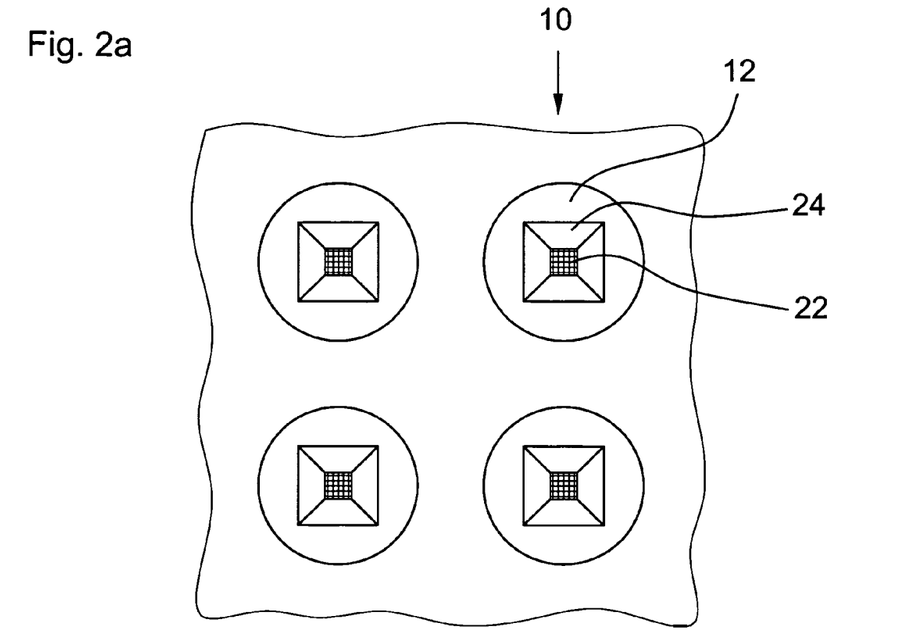
FIG. 2a schematic representation of sections of the device, displaying a round cross-section and pyramidal spouts on the side of discharge.
Figure 2B:
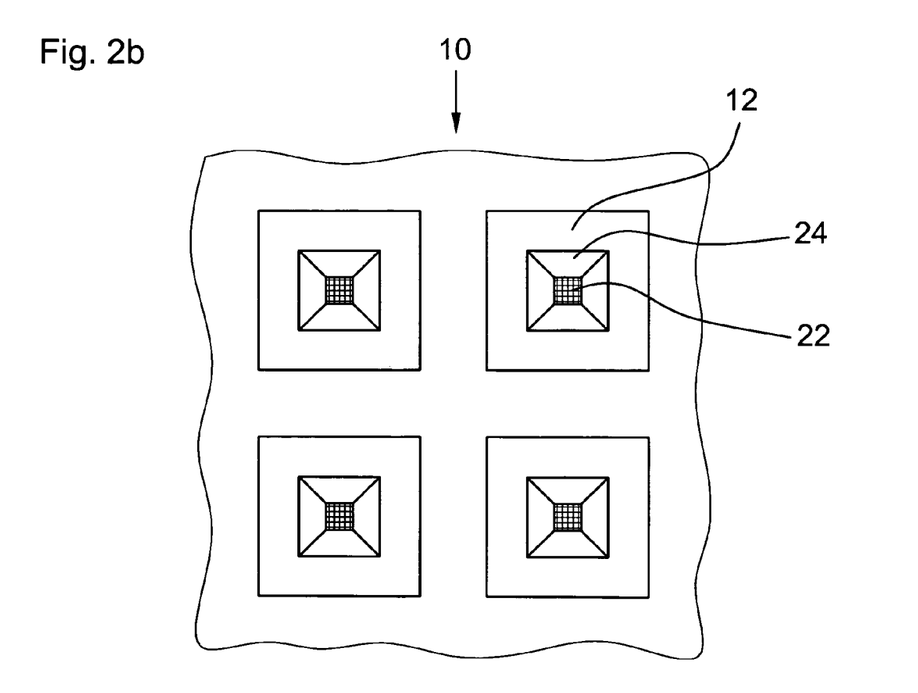
FIG. 2b schematic representation of sections of the device, displaying a rectangular cross-section and pyramidal spouts on the side of discharge.
Figure 2C:
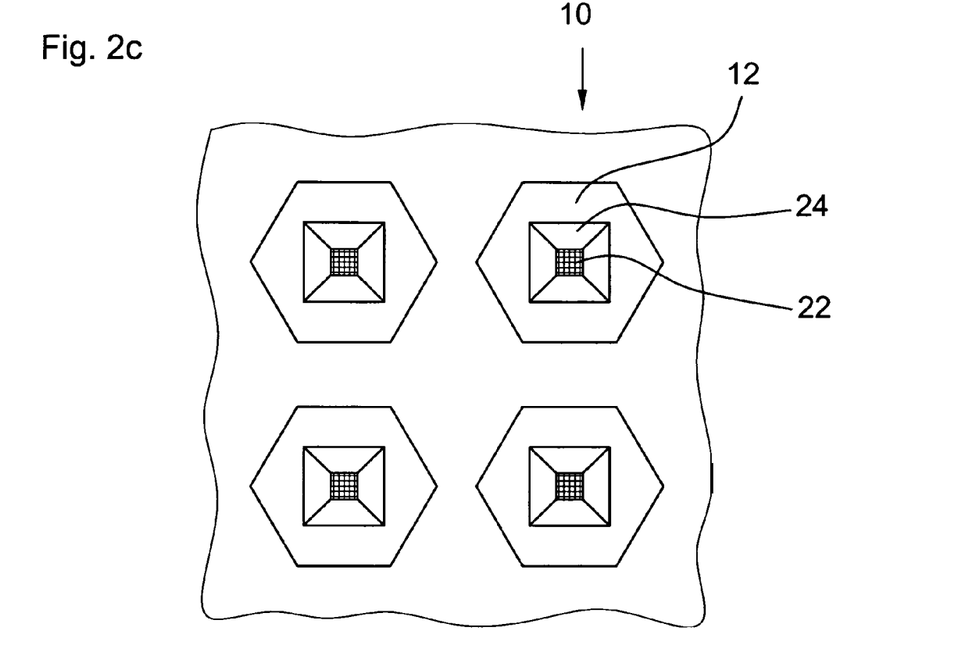
FIG. 2c schematic representation of sections of the device, displaying a polygonal cross-section and pyramidal spouts on the side of discharge.

In FIG. 2a, the sections (12) are shown having a round cross-section and pyramid-shaped spouts (24). In FIG. 2b, the sections (12) are shown having a rectangular, preferably a square cross-section and pyramid-shaped spouts. In FIG. 2c, the sections (12) are shown having a polygonal cross-section and pyramid-shaped spouts (24) and in FIG. 2d, the sections (12) are shown having a round cross-section and calotte-shaped spouts (24).

Figure 2D:
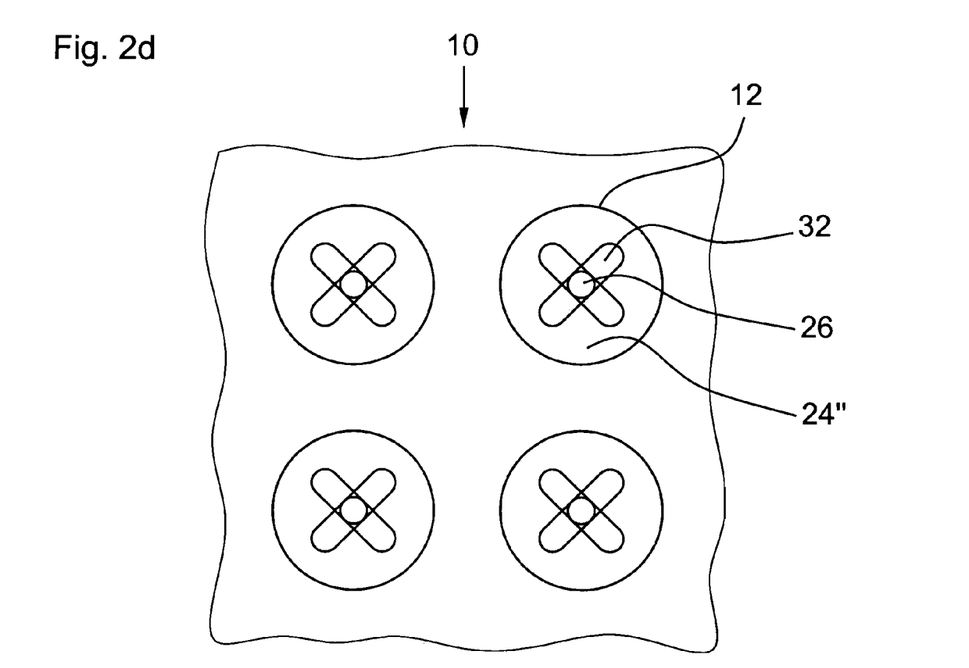
FIG. 2d schematic representation of sections of the device, displaying a round cross-section and calotte-shaped spouts along with star-shaped borings on the side of discharge.

The problem of a spherical building block (20) blocking the opening (26) or the membrane (22) adjacent to the calotte-shaped spout (24") is solved by implementing borings (32), as illustrated in FIG. 2d. These borings (32) ensure drainage and inhibit clogging or sealing of the openings (26) or membranes (22), respectively.

Figure 3A:
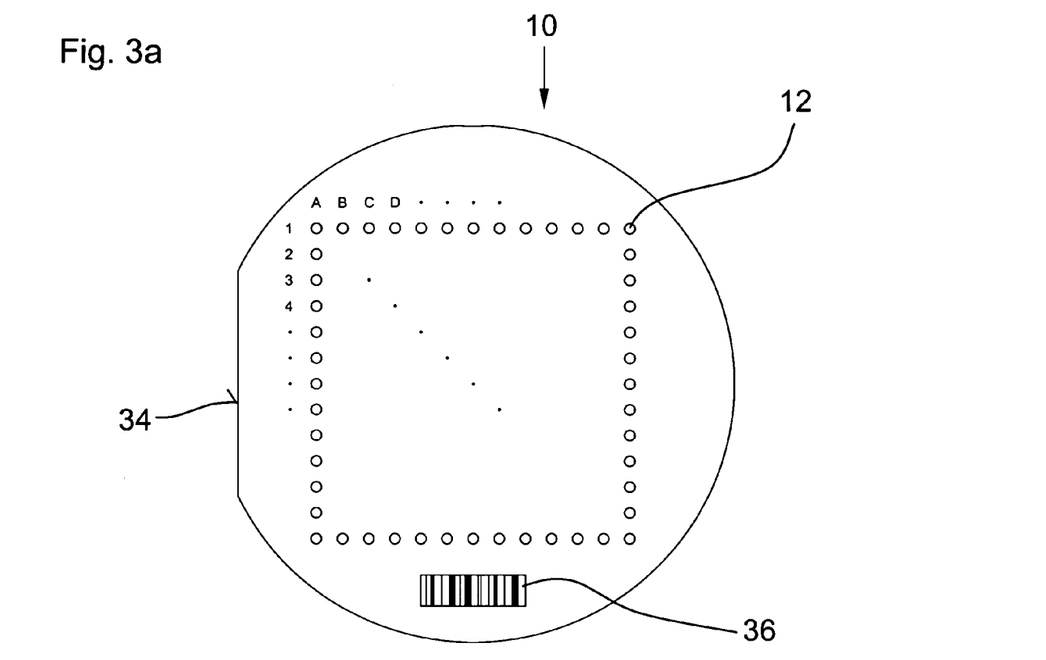
FIG. 3a schematic representation of the entire device, displaying a round outer contour and an area of contact for identifying the position.
Figure 3B:
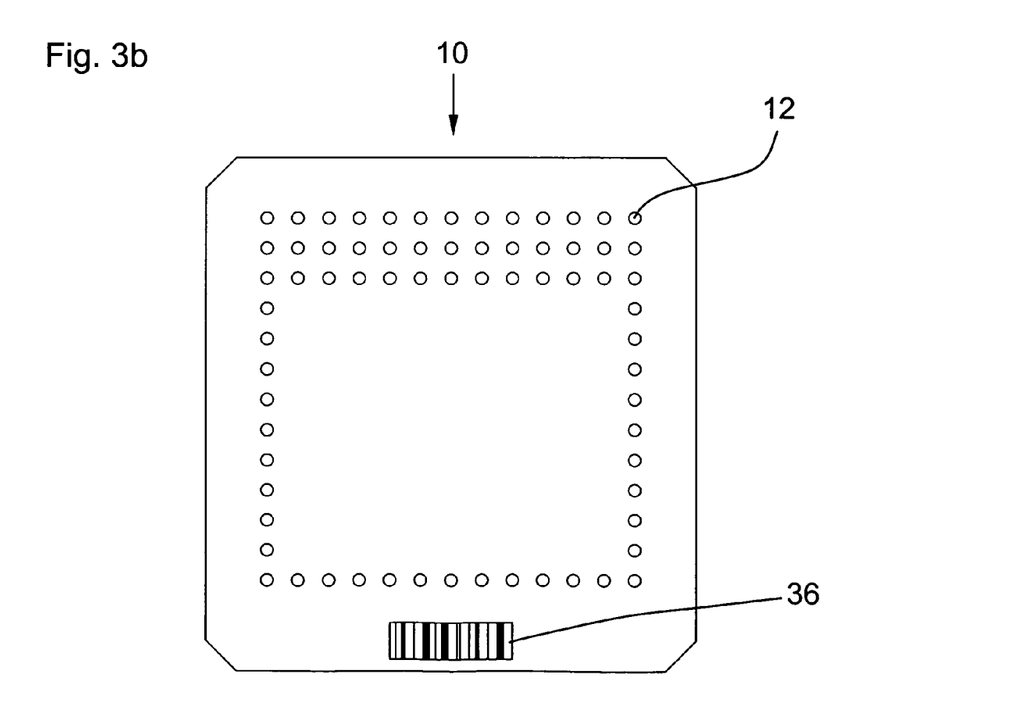
FIG. 3b schematic representation of the entire device, displaying a square outer contour.
Figure 3C:
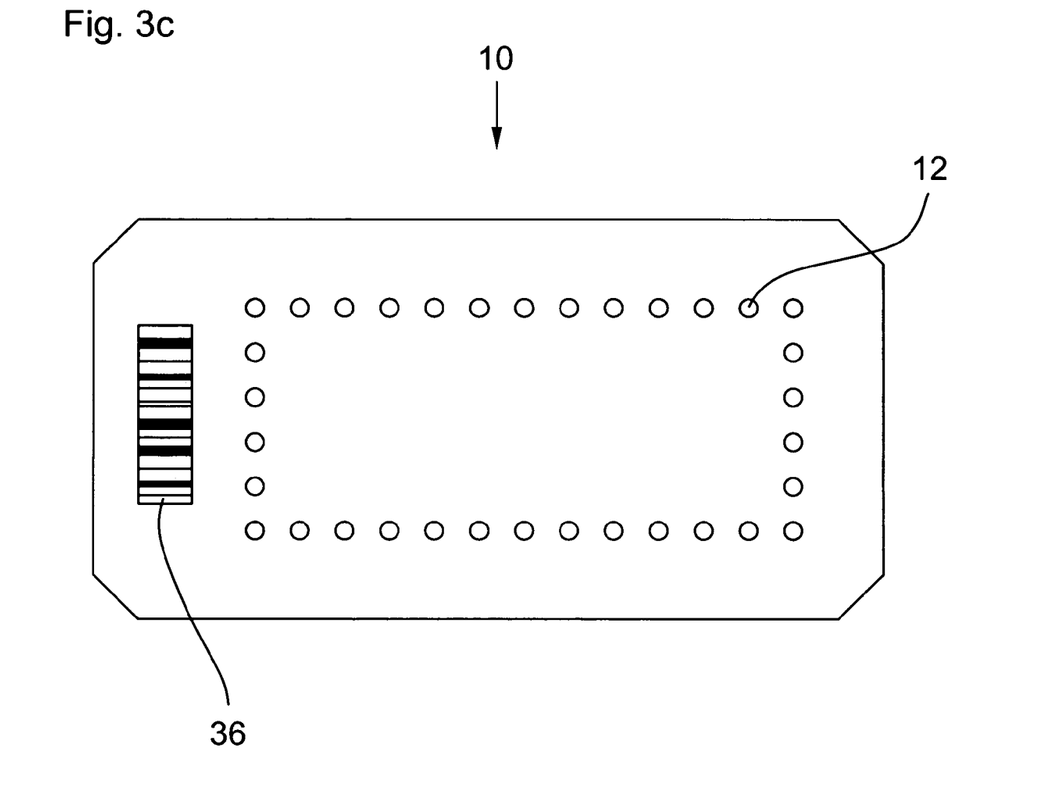
FIG. 3c schematic representation of the entire device, displaying a rectangular outer contour.

FIGS. 3a to 3c show different outer contours for the device (10) with FIG. 3a showing the device (10) having a round outer contour and an area of contact (34) that is preferably used for the purpose of position identification. FIG. 3b shows the device (10) having a square outer contour and slanted corners. Finally, FIG. 3c shows device (10) having a rectangular outer contour and slanted corners.

The slanted corners shown in FIGS. 3b and 3c can be used for position identification as well, assuming that the geometrical shape is suitably defined.

Furthermore, the sections (12) along with their possible positioning within the device (10) are indicated in FIGS. 3a to 3c.

In addition, the devices (10) shown in FIGS. 3a to 3c display encoding by means of a bar code (36), which can be used for identifying the device (10) of for identifying the combinatorial library of materials or for identifying the device (10) together with the combinatorial library of materials. Furthermore, the bar code (36) can be used simultaneously for identifying the device (10) and/or the combinatorial library of materials and for the purpose of identifying the position of the device (10).

Figure 4A:
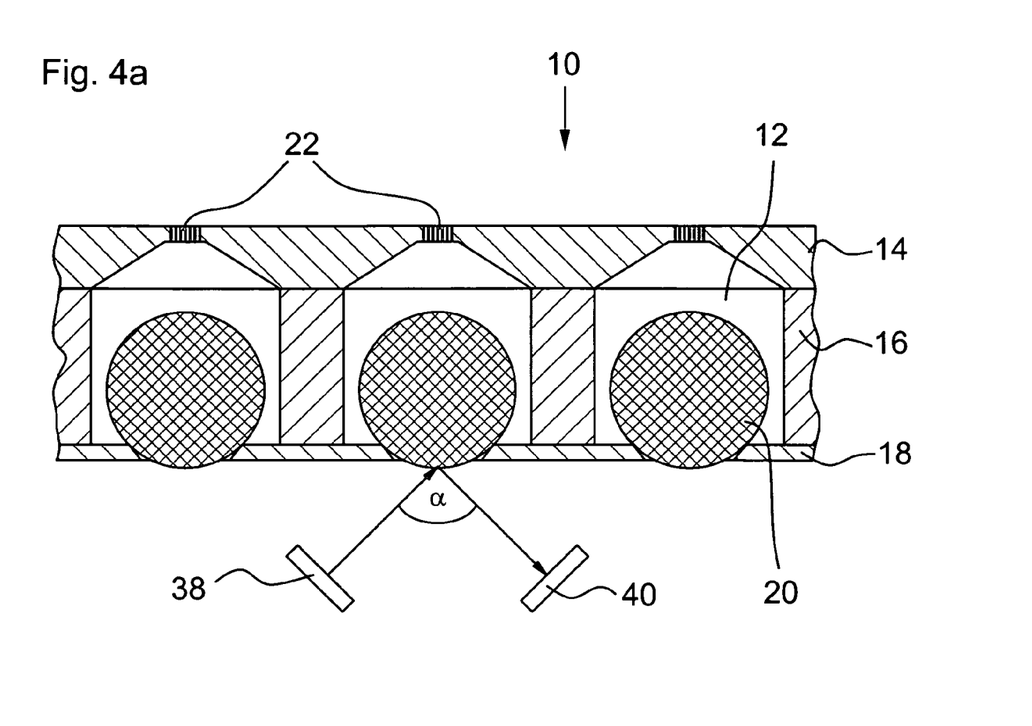
FIG. 4a schematic representation of the cross section of two sections of the device, displaying removable membranes on the side of discharge including a unit for analysis or identification.

FIG. 4a shows a cross-section of two sections for an additional embodiment of the device (10) according to the present invention. Here, the membranes (22) located on the discharge side are not an integral part of the second silicon layer (18) but are intended as removable membranes (not shown in FIG. 4a), preferably being part of an additional layer or plate. This design feature enables direct access to the building blocks (20) located inside the sections (12) of the device (10), allowing to identify, for example, the building blocks (20).

The identification of the building blocks is possible, for example, by using a radiation source (38) and a detector (40), preferably oriented at an angle α relative to each other. This can be realized, for example, by employing XRF.

Figure 4B:
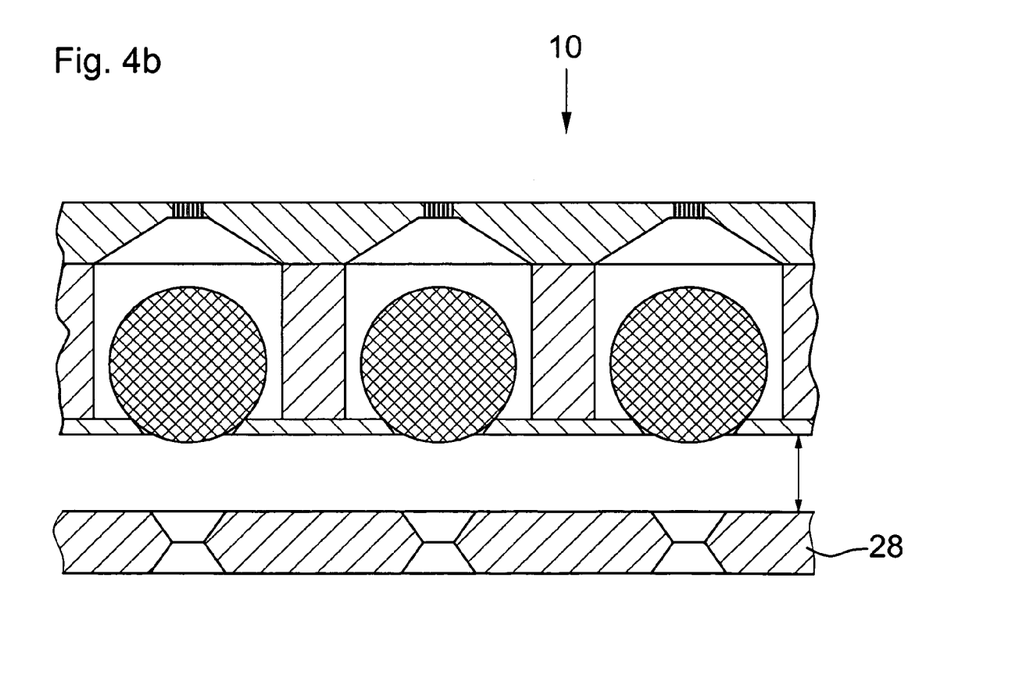
FIG. 4b schematic representation of the cross section of two sections of the device, displaying removable membranes on the side of discharge as well as a removable discharge guiding element.

An embodiment of the device (10) that is comparable to the one shown in FIG. 4a is shown in FIG. 4b with the distinction that a removable discharge guiding element (28) is planned instead of a removable membrane.

Figure 5A:
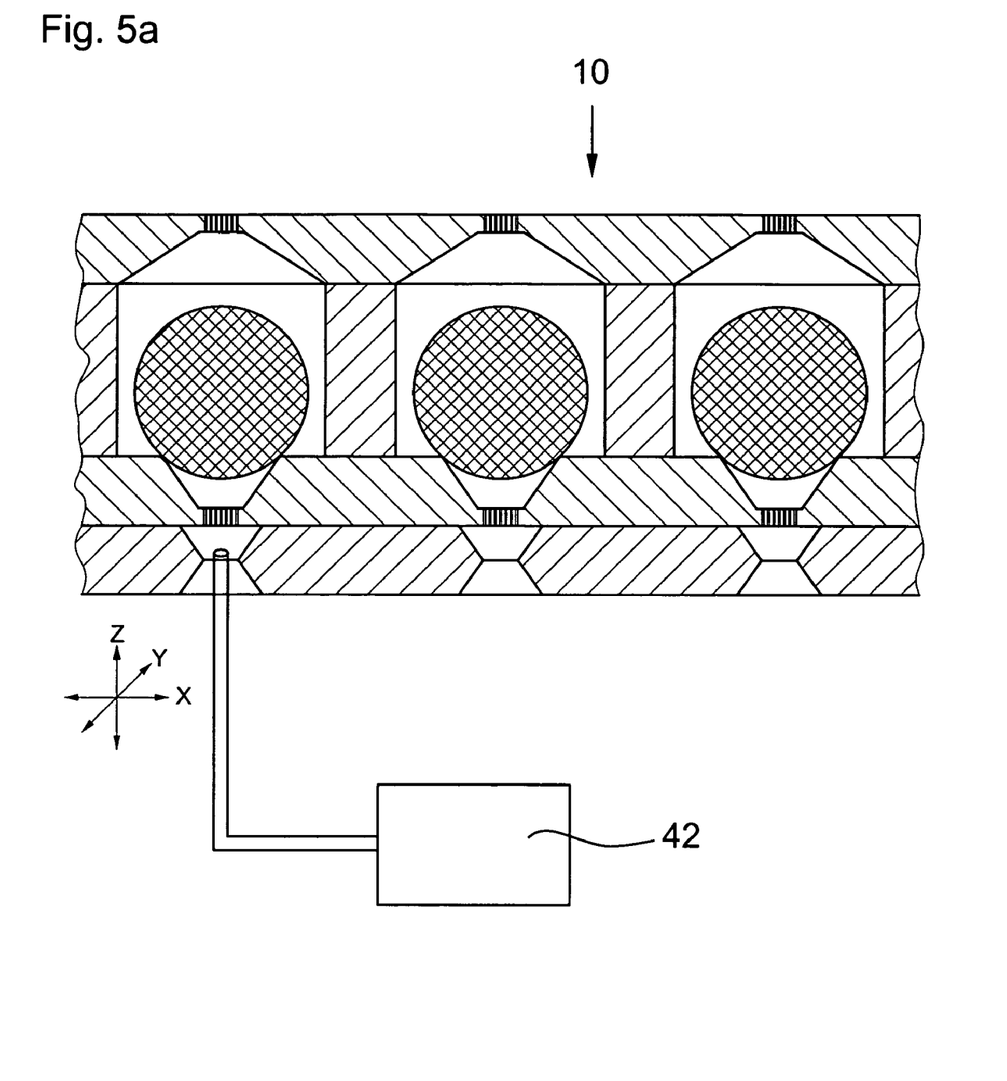
FIG. 5a schematic representation of the cross section of two sections of the device, displaying membranes on the sides of discharge and of feed as well as a discharge guiding element and a unit for analysis with sensor.

FIG. 5a shows an embodiment of the device (10) similar to the one presented in FIG. 1d, displaying, for example, a removable discharge guiding element (28) and a sensor (e.g. a sensing capillary) that is adjustable in all three directions (three-dimensional). The sensor accepts the discharge and redirects it, possibly only in parts, to a unit of analysis such as a mass spectrometer or a gas chromatograph.

Figure 5B:
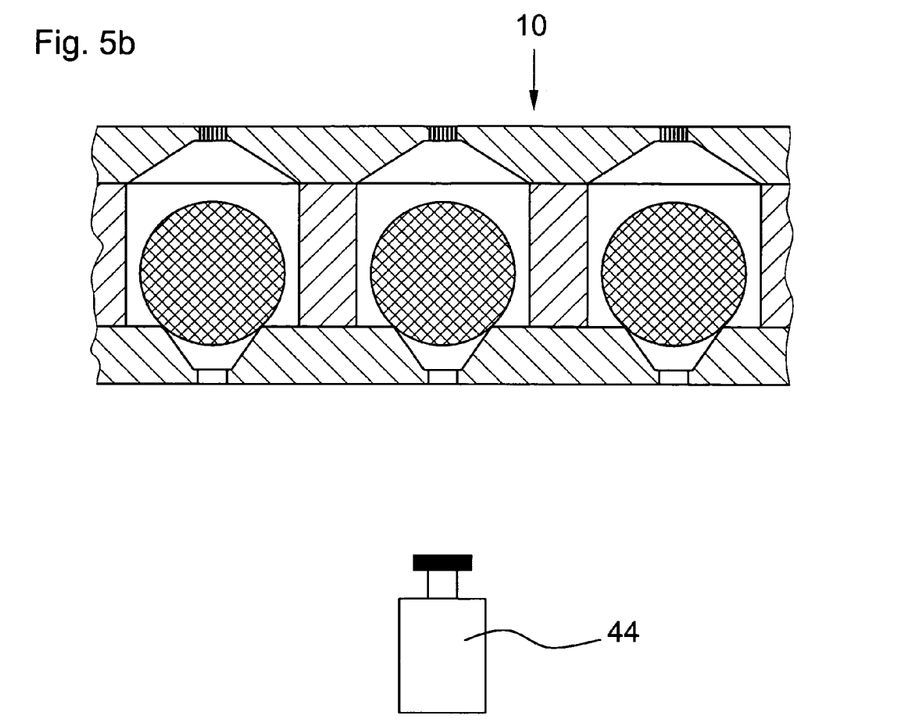
FIG. 5b schematic representation of the cross section of two sections of the device, displaying membranes on the side of feed as well as a unit for analysis.

Another embodiment of the device (10) similar to the design shown in FIG. 1d is shown in FIG. 5b. The difference, however, is that openings (26) are planned for the discharge side and not membranes (22) as shown in FIG. 1d.

Figure 5C:
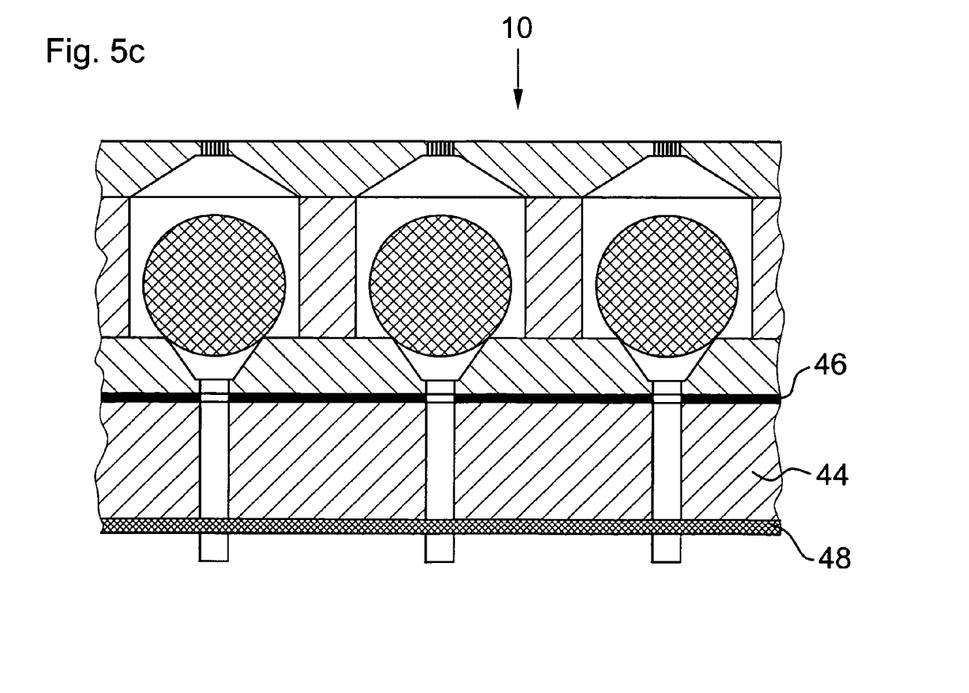
FIG. 5c schematic representation of the cross section of two sections of the device, displaying membranes on the side of feed and an alternate unit for analysis.

This kind of set-up can be used preferably for IR-analysis of the combinatorial library of materials by employing a unit of analysis (42), such as an IR-camera. Further possible methods of analysis are, for example, transmission analysis and photoacoustic methods. An additional possibility for analysis, adsorber analysis is shown in FIG. 5c. In contrast to FIG. 5b, a heat exchanger (44) is employed for the discharge side of the device (10).

This heat exchanger (44) displays a seal (46), pointing into the direction of the device, and adsorbers (48), such as filter paper, pointing into the opposite direction.

The invention claimed is:

1. A device for analyzing and archiving a combinatorial library of materials, the device comprising:
    (a) a first reaction chamber and a second reaction chamber, the first reaction chamber and the second reaction chamber each having a cylindrical upper portion with a diameter and a lower portion with walls defining a tapered polyhedral sink configured to hold at least one spherical building block, with each sink having an upper end;
    (b) a first feeding channel connected to the upper portion of the first reaction chamber and a second feeding channel connected to the upper portion of the second reaction chamber, the first feeding channel being separate from the second feeding channel;
    (c) a first discharge channel connected to the lower portion of the first reaction chamber and a second discharge channel connected to the lower portion of the second reaction chamber, the first discharge channel being separate from the second discharge channel;
    (d) means for identifying the device or the combinatorial library of materials or for identifying the device and the combinatorial library of materials; and
    (e) a spherical building block in each of the first reaction chamber and the second reaction chamber, with a major portion of the building block disposed within the upper portion of the reaction chamber above the sink and a minor portion of the building block disposed within the lower portion of the reaction chamber in point contact on the walls of the sink, the diameter of the building block being less than 90% of the diameter of the upper portion of the reaction chamber and not less than 70% of the width of the sink at its upper end.

2. A device according to claim 1, further comprising a porous membrane located within one of the first feeding channel, the second feeding channel, the first discharge channel, or the second discharge channel.

3. A device according to claim 1, further comprising means for sealing and opening the first and second reaction chambers.

4. A device according to claim 1, wherein the device is made from silicon, glass, metal, alloys, ceramics, polymers, mixed materials, or composite materials.

5. A device for analyzing and archiving a combinatorial library of materials, the device comprising:
    (a) a first reaction chamber and a second reaction chamber, the first reaction chamber and the second reaction chamber each having a cylindrical upper portion with a diameter and a lower portion with walls defining a tapered polyhedral sink configured to hold at least one spherical building block, with each sink having an upper end;
    (b) a first feeding channel connected to the upper portion of the first reaction chamber and a second feeding channel connected to the upper portion of the second reaction chamber, the first feeding channel being separate from the second feeding channel;
    (c) a first discharge channel connected to the lower portion of the first reaction chamber and a second discharge channel connected to the lower portion of the second reaction chamber, the first discharge channel being separate from the second discharge channel;

(d) means for identifying the device or the combinatorial library of materials or for identifying the device and the combinatorial library of materials; and (e) a spherical building block in each of the first reaction chamber and the second reaction chamber, with a portion of the building block disposed within the upper portion of the reaction chamber above the sink and a portion of the building block disposed within the lower portion of the reaction chamber in point contact on the walls of the sink.

* * * * *